(12) United States Patent
Fukunaga

(10) Patent No.: US 10,763,671 B2
(45) Date of Patent: Sep. 1, 2020

(54) POWER MANAGEMENT APPARATUS, POWER MANAGEMENT SYSTEM, POWER MANAGEMENT METHOD, AND NON-TRANSITORY STORAGE MEDIUM

(71) Applicant: NEC Corporation, Tokyo (JP)

(72) Inventor: Masajiro Fukunaga, Tokyo (JP)

(73) Assignee: NEC Corporation, Tokyo (JP)

( * ) Notice: Subject to any disclaimer, the term of this patent is extended or adjusted under 35 U.S.C. 154(b) by 203 days.

(21) Appl. No.: 15/531,049

(22) PCT Filed: Nov. 26, 2015

(86) PCT No.: PCT/JP2015/083250
§ 371 (c)(1),
(2) Date: May 26, 2017

(87) PCT Pub. No.: WO2016/084903
PCT Pub. Date: Jun. 2, 2016

(65) Prior Publication Data
US 2018/0309295 A1    Oct. 25, 2018

(30) Foreign Application Priority Data
Nov. 28, 2014 (JP) ................... 2014-241720

(51) Int. Cl.
*H02J 3/14* (2006.01)
*H02J 3/28* (2006.01)
(Continued)

(52) U.S. Cl.
CPC ............... *H02J 3/28* (2013.01); *G06Q 50/06* (2013.01); *H02J 3/14* (2013.01); *H02J 13/0006* (2013.01);
(Continued)

(58) Field of Classification Search
None
See application file for complete search history.

(56) References Cited

U.S. PATENT DOCUMENTS 9,698,597 B1 * 7/2017 Ramesh ............... H02J 1/10
2006/0058897 A1 * 3/2006 Senda ............... B60R 16/03
700/22
(Continued)

FOREIGN PATENT DOCUMENTS

JP    2002-79295    3/2002
JP    3403368    5/2003
(Continued)

OTHER PUBLICATIONS

Japanese Office Action issued by the Japanese Patent Office in counterpart Japanese Patent Application No. 2016-561947, dated Oct. 29, 2019.
(Continued)

*Primary Examiner* — Thomas C Lee
*Assistant Examiner* — Gary Collins
(74) *Attorney, Agent, or Firm* — Finnegan, Henderson, Farabow, Garrett & Dunner, L.L.P.

(57) ABSTRACT

An object of the invention is to reduce an inconvenience in which power consumption from a commercial power supply exceeds a predetermined threshold. To achieve the object, there is provided a power management apparatus (1) including: a load monitoring unit (10) that specifies a timing, at which power consumption of a predetermined load (3) present in a unit power network (100) exceeds a predetermined value, before the timing; and a power storage system control unit (20) that controls the power storage system (2) supplying power to the unit power network (100) to start power supply a predetermined period of time before the timing.

7 Claims, 13 Drawing Sheets

(51) Int. Cl.
*G06Q 50/06* (2012.01)
*H04W 52/02* (2009.01)
*H02J 13/00* (2006.01)
*H02J 3/00* (2006.01)

(52) U.S. Cl.
CPC ..... *H02J 13/0079* (2013.01); *H04W 52/0216* (2013.01); *H02J 3/003* (2020.01); *H02J 2310/14* (2020.01); Y02B 70/3225 (2013.01); Y04S 20/222 (2013.01)

(56) References Cited

U.S. PATENT DOCUMENTS

| | | | | |
|---|---|---|---|---|
| 2012/0046798 A1* | 2/2012 | Orthlieb | ................... | H02J 3/32 700/297 |
| 2012/0059527 A1* | 3/2012 | Beaston | .............. | H01M 10/441 700/295 |
| 2013/0079937 A1* | 3/2013 | Aisu | ................... | H02J 13/0086 700/286 |
| 2013/0127249 A1 | 5/2013 | Ukai et al. | | |
| 2015/0372538 A1* | 12/2015 | Siegler | ................... | H02J 9/062 307/23 |
| 2016/0154716 A1* | 6/2016 | Lee | ........................... | G06F 1/30 714/14 |

FOREIGN PATENT DOCUMENTS

| | | |
|---|---|---|
| JP | 2006-067644 | 3/2006 |
| JP | 2013-143838 | 7/2013 |
| JP | 2014-501970 | 1/2014 |
| JP | 2014-503878 | 2/2014 |
| JP | 2014-507018 | 3/2014 |
| JP | 2016-42360 | 3/2016 |
| JP | 2016-42780 | 3/2016 |
| WO | WO 2012/014474 A1 | 2/2012 |
| WO | WO 2013/128731 A1 | 9/2013 |

OTHER PUBLICATIONS

Decision to Grant a Patent dated Feb. 12, 2020, by the Japanese Patent Office in counterpart Japanese Patent Application No. JP 2016-561947.

* cited by examiner

FIG. 7

| LOAD ID | $W_d(w)$ |
|---------|----------|
| 00001   | ○ × ○    |
| ⋮       | ⋮        |

FIG. 10

| POWER CONSUMPTION (w) | PREDETERMINED TIME PERIOD (s) |
|---|---|
| ○○○~△△△ | × × |
| △△△~□□□ | ○○ |
| ⋮ | ⋮ |

POWER MANAGEMENT APPARATUS, POWER MANAGEMENT SYSTEM, POWER MANAGEMENT METHOD, AND NON-TRANSITORY STORAGE MEDIUM

CROSS-REFERENCE TO RELATED PATENT APPLICATIONS

This application is a National Stage Entry of International Application No. PCT/JP2015/083250, filed Nov. 26, 2015, which claims priority from Japanese Patent Application No. 2014-241720, filed Nov. 28, 2014. The entire contents of the above-referenced applications are expressly incorporated herein by reference.

TECHNICAL FIELD

The present invention relates to a power management apparatus, a power management system, a power management method, and a program.

BACKGROUND ART

Peaks of power (W) received from commercial power supplies to be consumed are attempted to be suppressed. A related technology is disclosed in Patent Document 1.

Patent Document 1 discloses a technology for suppressing peaks of power low in a system configured by plural loads. In the technology, an operation schedule of the plural loads is generated so that operation time periods of the plural loads are minimized to the necessary levels and overlapping operation time periods of the loads are minimized. Operations of the plural loads are controlled based on the operation schedule.

RELATED DOCUMENT

Patent Document

[Patent Document 1] Japanese Patent Application Publication No. 2002-79295
[Patent Document 2] Japanese Patent No. 3403368
[Patent Document 3] Japanese Translation of PCT International Application Publication No. 2014-503878
[Patent Document 4] Japanese Translation of PCT International Application Publication No. 2014-501970
[Patent Document 5] Japanese Translation of PCT International Application Publication No. 2014-507018

SUMMARY OF THE INVENTION

Technical Problem

According to the technology disclosed in Patent Document 1, by appropriately generating the operation schedule, it is possible to prevent inconvenience in which power (W) received from a commercial power supply to be consumed exceeds a predetermined threshold. However, the technology assumes that control is performed such that a sum of power consumption of the plural loads is equal to or less than a threshold of the power received from a commercial power supply and consumed. This assumption burdens users in some cases.

An object of the invention is to provide a new technology for reducing inconvenience in which power (W) received from a commercial power supply to be consumed exceeds a predetermined threshold.

Solution to Problem

According to an aspect of the invention, there is provided a power management apparatus including: a load monitoring unit that specifies a timing, at which power consumption of a predetermined load present in a unit power network exceeds a predetermined value, before the timing; and a power storage system control unit that controls a power storage system supplying power into the unit power network to start power supply before the timing by a predetermined period of time.

According to another aspect of the invention, there is provided a power management system including: the power management apparatus; and a power storage system that supplies power into a unit power network.

According to still another aspect of the invention, there is provided a power management method executed by a computer, the method including: a load monitoring step of specifying a timing, at which power consumption of a predetermined load present in a unit power network exceeds a predetermined value, before the timing; and a power storage system control step of controlling the power storage system supplying power into the unit power network to start power supply before the timing by a predetermined period of time.

According to further still another aspect of the invention, there is provided a program causing a computer to function as: a load monitoring unit that specifies a timing at which power consumption of a predetermined load present in a unit power network exceeds a predetermined value before the timing; and a power storage system control unit that controls a power storage system supplying power into the unit power network to start power supply before the timing by a predetermined period of time.

Advantageous Effects of Invention

According to the invention, it is possible to realize a new technology for reducing inconvenience in which power (W) received from a commercial power supply to be consumed exceeds a predetermined threshold.

BRIEF DESCRIPTION OF THE DRAWINGS

The above-described objects, other objects, features, and advantages will be apparent throughout preferred exemplary embodiments to be described below and the following drawings appended to the exemplary embodiments.

FIG. 7 is a diagram schematically illustrating an example of information retained by the power management apparatus according to the exemplary embodiment.

FIG. 10 is a diagram schematically illustrating an example of information retained by the power management apparatus according to the exemplary embodiment.

DESCRIPTION OF EXEMPLARY EMBODIMENTS

Hereinafter, a hardware configuration of an apparatus according to a present exemplary embodiment will be described. Each unit included in the apparatus according to the present exemplary embodiment is realized by any combination of hardware and software of any computer with a focus on a central processing unit (CPU), a memory, a program loaded on the memory (also including a program which is stored in the memory in advance when shipping out the apparatus and a program which is downloaded from a storage medium such as a compact disc (CD), or a server or the like on the Internet), a storage unit such as a hard disk which stores the program, and an interface for network connection. In addition, those skilled in the art can understand that various modifications can be made to examples for realizing the method and apparatus.

Figure 1:
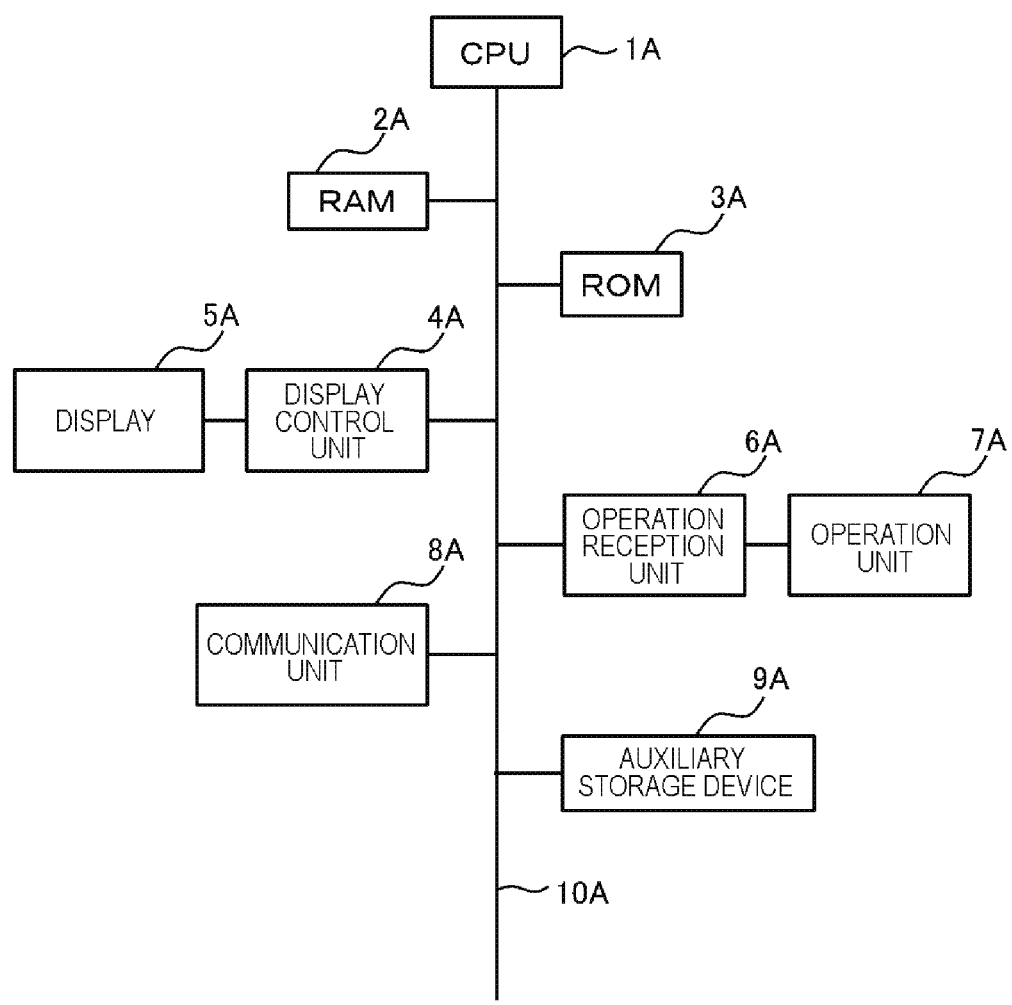
FIG. 1 is a diagram conceptually illustrating an example of a hardware configuration of an apparatus according to an exemplary embodiment.

FIG. 1 is a diagram conceptually illustrating an example of a hardware configuration of the apparatus according to the exemplary embodiment. As illustrated, the apparatus according to the exemplary embodiment includes, for example, a CPU 1A, a random access memory (RAM) 2A, a read-only memory (ROM) 3A, a display control unit 4A, a display 5A, an operation reception unit 6A, an operation unit 7A, a communication unit 8A, and an auxiliary storage device 9A connected to each other through a bus 10A. Although not illustrated, the apparatus may additionally include other elements such as input and output interfaces connected to external apparatuses in a wired manner, a microphone, and a speaker.

The CPU 1A controls each element and an entire computer of the apparatus. The ROM 3A includes areas which store a program causing a computer to operate or various application program and various kinds of setting data used when such a program operates. The RAM 2A includes an area which temporarily stores data, such as a work area in which a program operate. The auxiliary storage device 9A is, for example, a hard disk drive (HDD) and can store large-volume data.

The display 5A is configured as, for example, a display device (for example, a light emitting diode (LED) display, a liquid crystal display, or an organic electroluminescence (EL) display). The display 5A may be a touch panel display integrated with a touch pad. The display control unit 4A reads data stored in a video RAM (VRAM), executes a predetermined process on the read data, and then transmits the data to the display 5A to display various screens. The operation reception unit 6A receives various operations through the operation unit 7A. The operation unit 7A includes an operation key, an operation button, a switch, a jog dial, a touch panel display, and a keyboard. The communication unit 8A is connected to a network such as the Internet or a local area network (LAN) in a wired and/or wireless manner to communicate with other electrical apparatus.

Hereinafter, the present exemplary embodiment will be described. Functional block diagrams used to describe the following exemplary embodiments illustrate blocks in units of functions rather than configurations in units of hardware. In the drawings, each apparatus is constituted by a single apparatus in the description, but realization methods are not limited thereto. That is, each apparatus may, of course, have a physically divided configuration or a logically divided configuration. The same reference numerals are given to the same constituent elements and the description thereof will not be appropriately repeated.

First Exemplary Embodiment

First, an overview of the exemplary embodiment will be described. The present inventor has examined a technology of reducing inconvenience in which power (W) received from a commercial power supply to be consumed exceeds a predetermined threshold (hereinafter referred to as a "commercial power supply threshold" in some cases) using a recently widespread power storage system. Hereinafter, "the power (W) received from a commercial power supply to be consumed" is simply referred to as "power consumption from a commercial power supply" in some cases.

In the technology, not only a commercial power supply but also a power storage system supplies power to a load. Therefore, in the case of the technology, by performing control such that a sum of power consumption (W) of plural loads (hereinafter referred to as "total load power consumption" in some cases) is equal to or less than a sum of a "commercial power supply threshold" and "a maximum output of a power storage system", it is possible to prevent inconvenience in which power consumption from a commercial power supply exceeds a commercial power supply threshold. Compared to a technology of the related art, a maximum allowable value of total load power consumption can be set to be high. Therefore, it is possible to suppress occurrence of the inconvenience in which power consumption from a commercial power supply exceeds a commercial power supply threshold. As a result of examination of the technology, the present inventor has newly found the following problem.

First, a power amount (Wh) suppliable from a power storage system is finite. Therefore, it is desirable to restrict power supply from the power storage system at an unnecessary timing. When power supply from the power storage system is continued even at a timing at which there is no risk of power consumption from a commercial power supply exceeding a commercial power supply threshold, a remaining amount of the power storage system may decrease to low at an earlier timing. As a result, an inconvenience may occur that at a timing when there is a risk of power consumption from the commercial power supply exceeding the commercial power supply threshold, the remaining amount becomes deficient and thus power may not be supplied from the power storage system.

Accordingly, the present inventor has examined a technology for supplying power from a power storage system at an appropriate timing, not constantly supplying power. Specifically, the present inventor has examined a technology for supplying power from a power storage system while power consumption of a predetermined load (for example, power consumption is equal to or greater than a predetermined value) exceeds the predetermined value (for example, while a power supply is applied (a power supply is on)).

Figure 2:
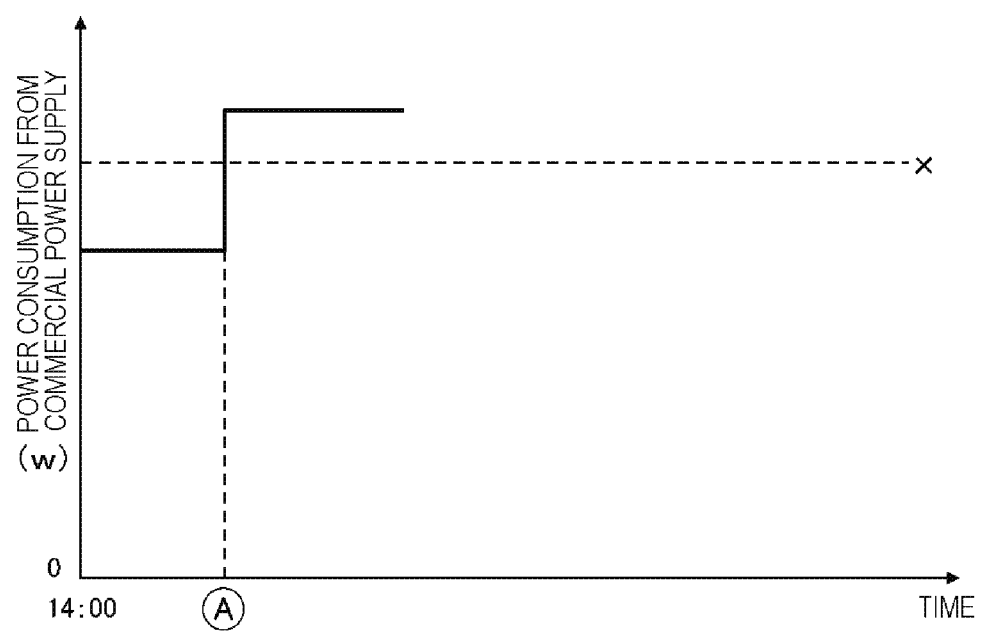
FIG. 2 is a diagram illustrating an advantageous effect according to the exemplary embodiment.

The power consumption of the load with the power consumption equal to or greater than the predetermined value occupies a large proportion of total load power consumption. Therefore, as illustrated in FIG. 2, when a predetermined load is on (when the predetermined load is operated), there is a high possibility of the total load power consumption exceeding the commercial power supply threshold. Note that the vertical axis of FIG. 2 represents a sum of power consumption of plural loads from a commercial power supply and the horizontal axis represents a time. A circled A indicates a timing at which the predetermined load is turned on and X indicates a commercial power supply threshold.

The present inventor has examined a means for detecting excessive power consumption of a predetermined load over a predetermined value and starting power supply from a power storage system in response to the detection. However, in the case of this means, power supply from the power storage system may not be readily available and a sum of the power consumption of the plural loads from the commercial power supply may exceed the commercial power supply threshold. Hereinafter, detailed description will be made.

First, t1 is assumed to be a period of time from a timing at which the predetermined load is turned on to a timing at which power consumption of the predetermined load becomes a predetermined value (w1). In this case, a power consumption rising velocity (V1) of the predetermined load from the timing at which the predetermined load is turned on to the timing at which the power consumption becomes the predetermined value (w1) is expressed as w1/t1.

On the other hand, t2 is assumed to a period of time from a timing at which power supply of the power storage system is started to a timing at which output power thereof becomes the predetermined value (w1). In this case, an output power rising velocity (V2) of the power storage system from the timing at which the power supply is started to the timing at which the output power becomes the predetermined value (w1) is expressed as w1/t2.

In a certain predetermined load, V2<V1 is satisfied. In this case, as illustrated in FIG. 3, when power supply from the power storage system is started in response to the detection of the predetermined load being turned on, power supply from the power storage system may not be readily available and a sum of the power consumption of the plural loads from the commercial power supply exceeds the commercial power supply threshold X temporarily in some cases.

Figure 3:
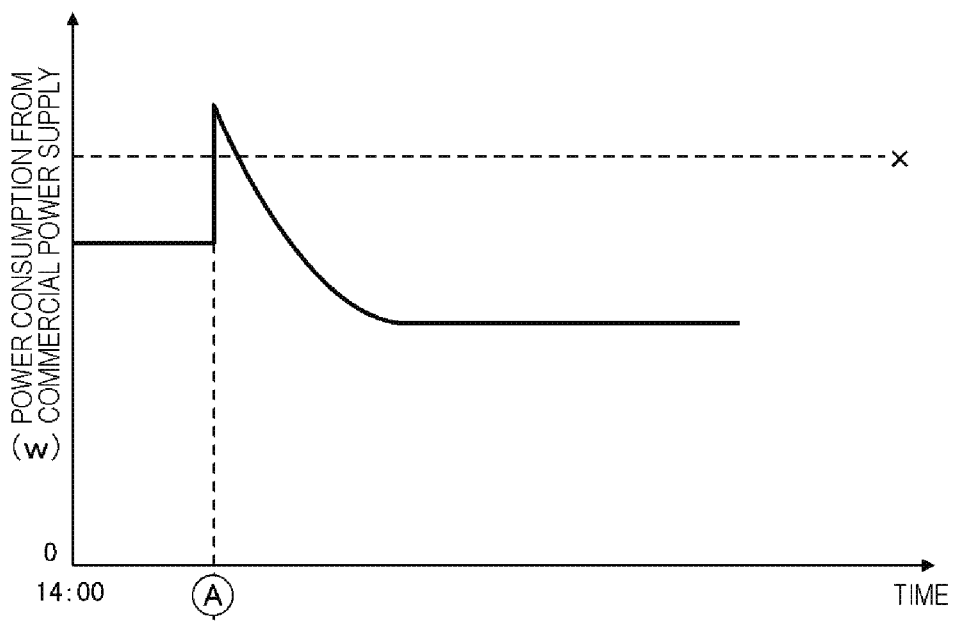
FIG. 3 is a diagram illustrating an advantageous effect according to the exemplary embodiment.
Figure 3:
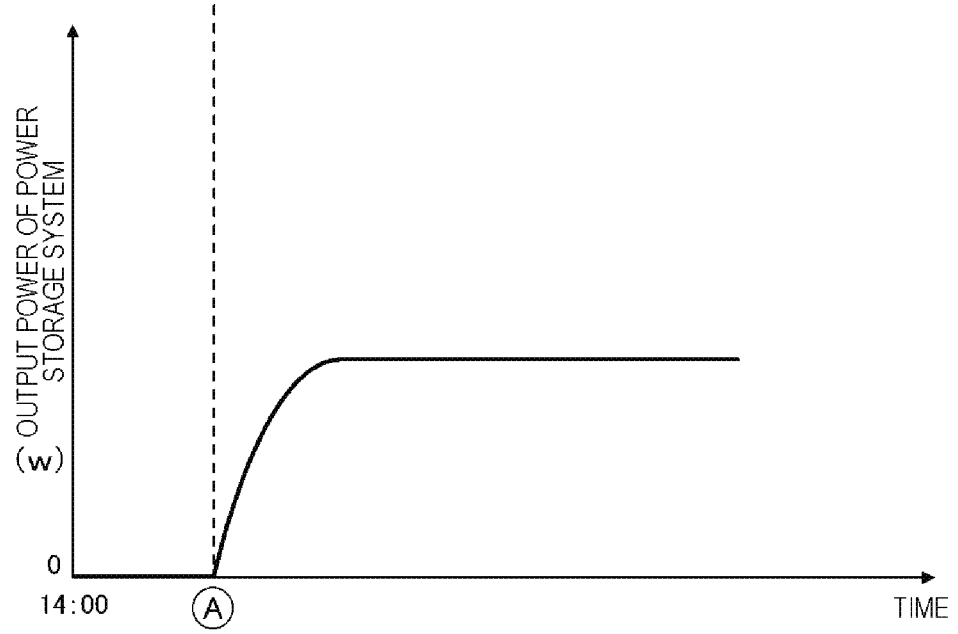

In the upper drawing of FIG. 3, the vertical axis, the horizontal axis, and information indicated by a circle A and X are the same as those of FIG. 2. In the lower drawing of FIG. 3, the vertical axis represents output power of the power storage system (that is, a sum of power consumption of the plural loads from the power storage system) and the horizontal axis represents a time. A circled A indicates a timing at which a predetermined load is turned on.

Figure 13:
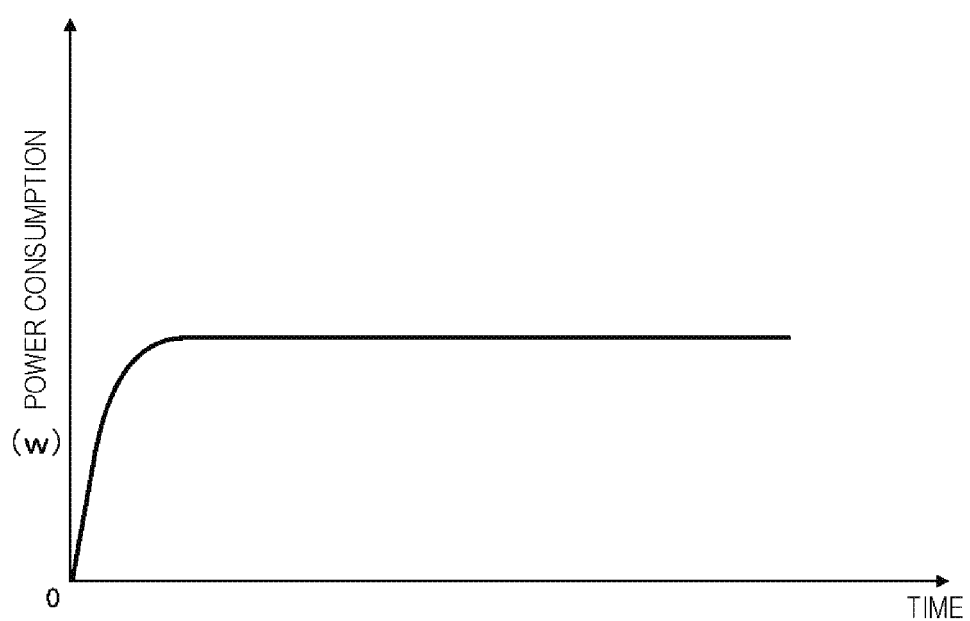
FIG. 13 is a diagram illustrating an example of a temporal change in power consumption of a predetermined load according to the exemplary embodiment.

In the case of the example in FIG. 3, power supply from the power storage system is immediately started after a timing (in the drawing, A) at which the predetermined load is turned on. However, the power consumption rising velocity (V1) of the predetermined load is considerably greater than the output power rising velocity (V2) of the power storage system. Therefore, the power output from the power storage system is not readily available and a sum of the power consumption of the plural loads from a commercial power supply exceeds the commercial power supply threshold X temporarily. Note that, as illustrated in FIG. 13, there is also a predetermined load in which V2<V1 is satisfied although the power consumption rising velocity (V1) is less than that of the example illustrated in FIG. 3. Even such a load, the same problem occurs.

Figure 4:
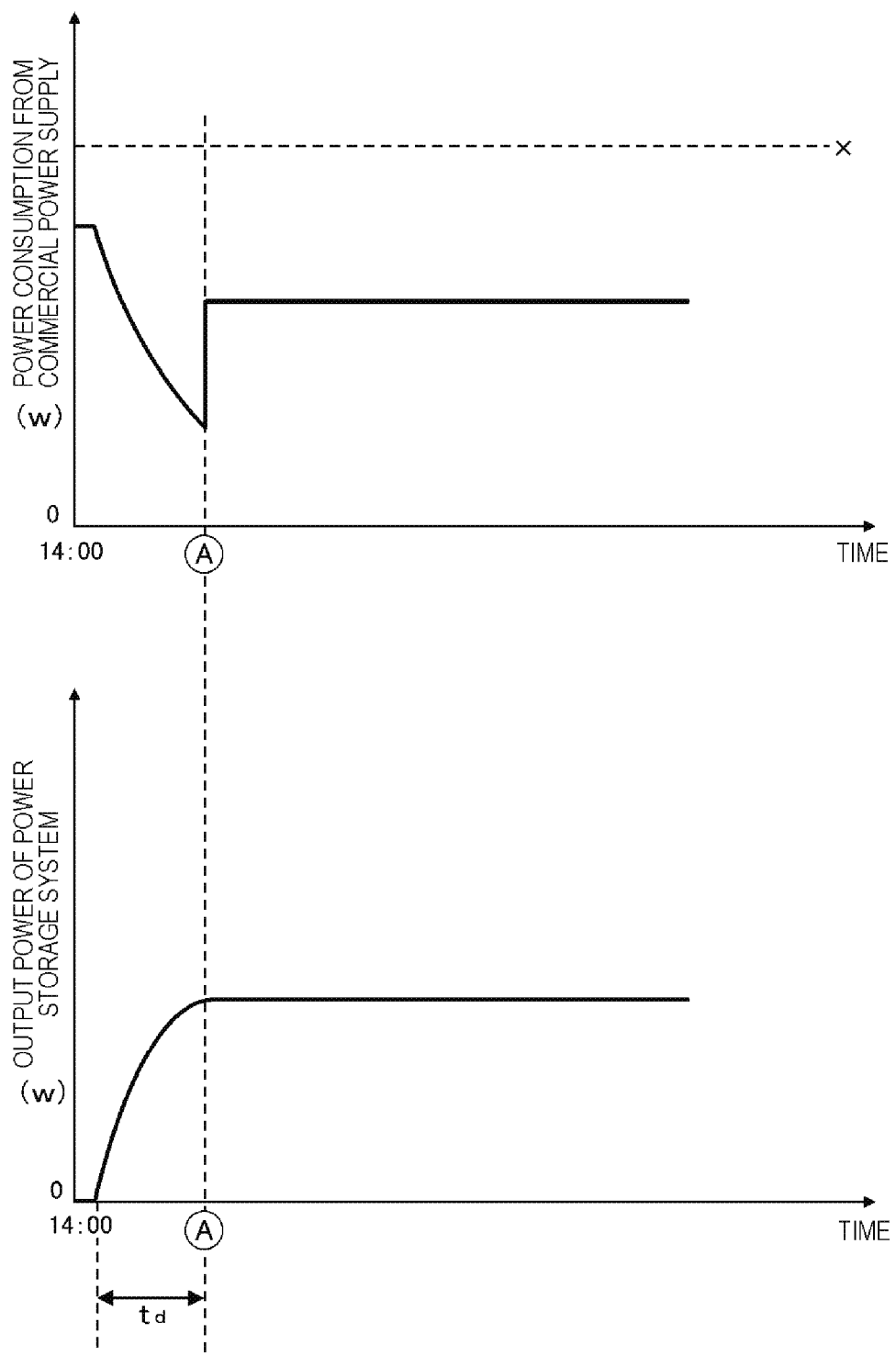
FIG. 4 is a diagram illustrating an advantageous effect according to the exemplary embodiment.

A power management apparatus according to the exemplary embodiment is configured to allow such inconvenience to be reduced. Specifically, the power management apparatus according to the exemplary embodiment specifies a timing, at which power consumption of a predetermined load exceeds a predetermined value (for example, a timing at which power is turned on), before the timing. Then, the power management apparatus according to the exemplary embodiment starts power supply from the power storage system a predetermined time before the timing. Thus, as illustrated in FIG. 4, the inconvenience in which the sum of the power consumption of the plural loads from the commercial power supply exceeds the commercial power supply threshold X is reduced. Note that the vertical axis, the horizontal axis, and information indicated by a circled A and X in FIG. 4 are the same as those of FIG. 3.

In FIG. 4, power supply from the power storage system is started a predetermined period of time td before an ON timing A at which a predetermined load is turned on. Then, according to the power supply from the power storage system, power consumption from the commercial power supply is lowered (the upper side of FIG. 4). Therefore, even in a case where the predetermined load is turned on at the ON timing A and accordingly, power consumption from the commercial power supply increases, it is possible to reduce the inconvenience of the value of the commercial power supply after the increase exceeding threshold X.

Hereinafter, the details of the exemplary embodiment will be described. First, an overall picture of the power management system according to the exemplary embodiment will be described with reference to FIG. 5.

The power management system according to the exemplary embodiment includes a power management apparatus 1 and a power storage system 2. The power management system may further include at least one of a server 4 and a monitoring apparatus 6.

The power management apparatus 1, the power storage system 2, and the monitoring apparatus 6 are installed for each predetermined unit that consumes power (hereinafter, a "power consuming unit" in some cases).

As the power consuming unit, for example, a housing unit (for example, a single house unit, or each housing unit such as an apartment), a facility unit (for example, an apartment building unit, a building unit, a factory unit, a store unit, or an amusement facility unit), a unit in which these units are segmented arbitrarily (for example, one floor unit or a unit of plural floors of a building), or a group unit in which these units are combined arbitrarily (for example, a collection unit in which plural apartments are collected) can be considered.

Figure 5:
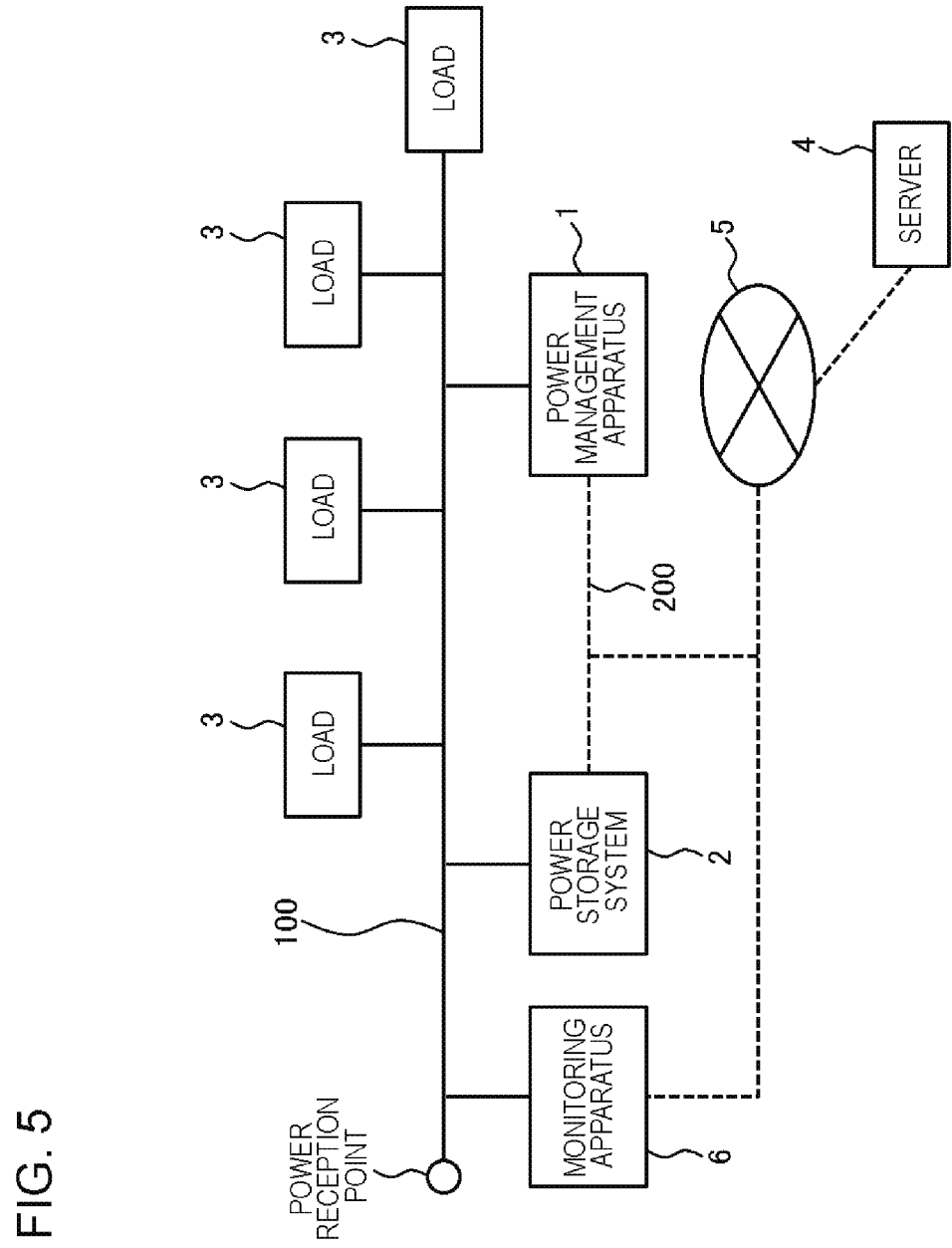
FIG. 5 is a diagram illustrating an example of an overall picture of a power management system according to the exemplary embodiment.

FIG. 5 is a configuration diagram corresponding to one power consuming unit. A unit power network 100 is a dedicated power interconnect network installed for each power consuming unit. For example, an interior interconnect installed in each house or a premise interconnect installed in each facility corresponds to the unit power network 100. The unit power network 100 is connected to a commercial power supply through a power reception point. Power is supplied from the commercial power supply to the unit power network 100 through the power reception point.

The power storage system 2 is connected to the unit power network 100. Therefore, power is supplied from the power storage system 2 to the unit power network 100 (discharge of the power storage system 2) or power is supplied from the unit power network 100 to the power storage system 2 (charge of the power storage system 2).

Plural loads 3 are connected to the unit power network 100. The load 3 may be an electric household appliance such as an air conditioner, a refrigerator, or a television, may be a commercial product such as a commercial refrigerator or a commercial air conditioner, or a machine used in a factory. Power is supplied from the unit power network 100 to the load 3 to operate the load 3. Note that power of a current flowing in the unit power network 100 may be supplied to operate at least one of the power management apparatus 1, the power storage system 2, and the monitoring apparatus 6.

The power management apparatus 1, the power storage system 2, and the monitoring apparatus 6 are communicably connected to each other through a communication network 200 configured in a wired and/or a wireless manner. The power management apparatus 1, the power storage system 2, the server 4, and the monitoring apparatus 6 are communicably connected to each other through a network 5 such as the Internet. Further, at least some of the loads 3 may be allowed to communicate with the monitoring apparatus 6 in a wired and/or wireless manner.

The monitoring apparatus 6 monitors a power consumption status in the power consuming unit. For example, the monitoring apparatus 6 communicates with a measurement sensor (not illustrated) installed near the power reception point and monitors an instantaneous value of total power consumption and/or a total consumption current in the power consuming unit.

The monitoring apparatus 6 may monitor and control an operation state of each load 3. For example, the monitoring apparatus 6 may monitor whether each of the plural loads 3 is in a turn-on state or a turn-off state and may generate and store a use record indicating an operation state at each time. In addition, the monitoring apparatus 6 may monitor an operation mode (for example, a pause mode, an air-cooling (strong) mode, or an air-cooling (weak) mode) of the load 3 in operation as the operation state and may store the operation mode as a use record. The use record may be transmitted to the server 4 and the server 4 may store the use record. The use record may be stored in association with attributes (for example, a month, a day of week, a date, weather, temperature, and humidity) of the day.

There are various means for monitoring the operation state of each load 3. For example, a measurement sensor may be installed for each predetermined load 3. Then, the monitoring apparatus 6 may specify the operation state of each load based on an instantaneous value of power consumption and/or a consumption current of each load 3 acquired from the measurement sensor. For example, when the instantaneous value is equal to or greater than a predetermined value, the load 3 may be specified to be in a turn-on state. When the instantaneous value is less than the predetermined value, the load 3 may be specified to be in a turn-off state. In addition, a technology disclosed in Japanese Patent No. 3403368 may be used. In this technology, a feature value of measurement data of each of the plural loads 3 in operation may be retained in advance. When an instantaneous value of power consumption and/or a consumption current of the entire unit power network 100 is measured near the power reception point, the load 3 in operation at each point of time is specified by comparing a feature value extracted from the measurement data and feature values arbitrary combining feature values of the plural loads 3. In addition, the monitoring apparatus 6 may specify the operation state of each load 3 at a current point of time by acquiring an instruction signal for changing the operation state which is input to each load 3 (for example, an instruction signal for turning on the power supply or an instruction signal for changing the operation mode to an "air-cooling (strong) mode") from each load 3.

The monitoring apparatus 6 may control operation (turn ON/OFF the power supply) of each of the plural loads 3. That is, the monitoring apparatus 6 may transmit an input of a power ON instruction and an input of a power OFF instruction to the load 3 through wired and/or wireless communication. Then, the load 3 may turn ON/OFF power based on the input of the power ON instruction and the input of the power OFF instruction received from the monitoring apparatus 6.

The power management apparatus 1 specifies a timing at which power consumption of the predetermined load 3 exceeds a predetermined value based on, for example, information acquired from at least one of the predetermined load 3, the server 4, and the monitoring apparatus 6 or information input from a user to the power management apparatus 1. Then, the power management apparatus 1 controls the power storage system 2 to start power supply a predetermined time before the timing.

Hereinafter, the timing at which power the consumption of the predetermined load 3 exceeds the predetermined value will be described as a timing at which the predetermined load 3 is turned on (at timing at which a power supply is applied). However, the timing at which power the consumption of the predetermined load 3 exceeds the predetermined value is not limited thereto. For example, in a case in which the predetermined load 3 may select plural operation modes (for example, a pause mode, an air-cooling (strong) mode, and an air-cooling (weak) mode), a timing at which the predetermined load selects a predetermined operation mode (for example, an air-cooling (strong) mode) out of these modes may be set as the timing at which the power consumption exceeds the predetermined value.

Figure 6:
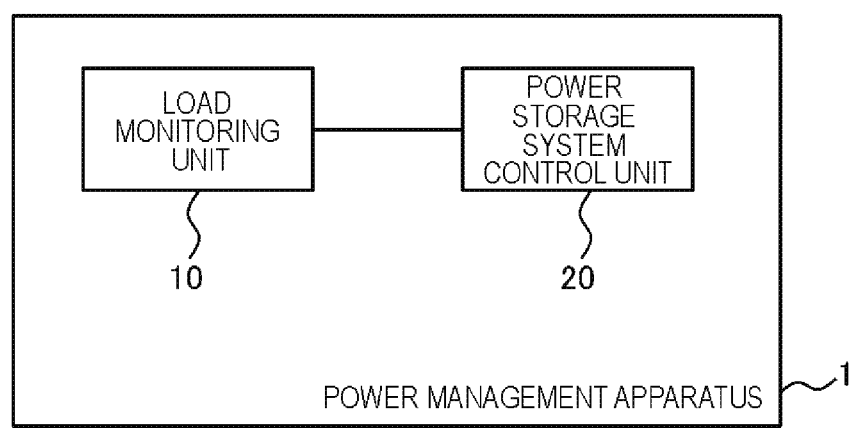
FIG. 6 is an exemplary functional block diagram of a power management apparatus according to the exemplary embodiment.

Next, the configuration of the power management apparatus 1 will be described in detail. FIG. 6 is an exemplary functional block diagram illustrating the power management apparatus 1 according to the exemplary embodiment. As illustrated, the power management apparatus 1 includes a load monitoring unit 10 and a power storage system control unit 20.

The load monitoring unit 10 specifies an ON timing, at which the predetermined load 3 present in the unit power network 100 is turned on, before the ON timing.

The "predetermined load 3 present in the unit power network 100" means that the load 3 that is connected to the unit power network 100 and receives power from the unit power network 100 to operate. The "ON timing" is a timing at which the predetermined load 3 starts a normal operation (an operation for achieving a main purpose of the load 3) and start of a mode (a standby mode or the like) in which power consumption is less than that of a normal operation is not included in the ON timing.

The predetermined load 3 is a part of the plural loads 3 present in the unit power network 100. The number of predetermined loads 3 may be one or more. For example, the predetermined load 3 may be a load of which power consumption is equal to or greater than a predetermined value. For example, power consumption of the predetermined load 3 may be $1/10$ or more, $1/5$ or more, or $1/3$ or more of a commercial power supply threshold. The "power consumption of the load 3" means power consumption (a representative value of the power consumption in a case in which a value thereof has a width) when the load 3 performs the normal operation (an operation for achieving a main purpose of the load 3) unless otherwise mentioned (the same applies below). In addition, the predetermined loads 3 may be a predetermined number of loads in the order from the largest power consumption among the plural loads 3 present in the unit power network 100.

In the predetermined load 3, the above-described power consumption rising velocity (V1) may be greater than the above-described output power rising velocity (V2) of the power storage system 2.

Here, V1 and V2 are rising velocities of the power consumption and the output power reaching a predetermined value (wd) from 0. Here, for each load 3, for example, wd may be determined based on the power consumption of each load 3. For example, wd may be the maximum value of the power consumption potentially consumed by each load 3 immediately after power ON until a predetermined period of time elapses.

In addition, wd may be power consumption when each load 3 performs the normal operation (an operation for achieving a main purpose of the load 3), the power consumption being a representative value of the power consumption in a case in which a value has a width.

Figure 7:
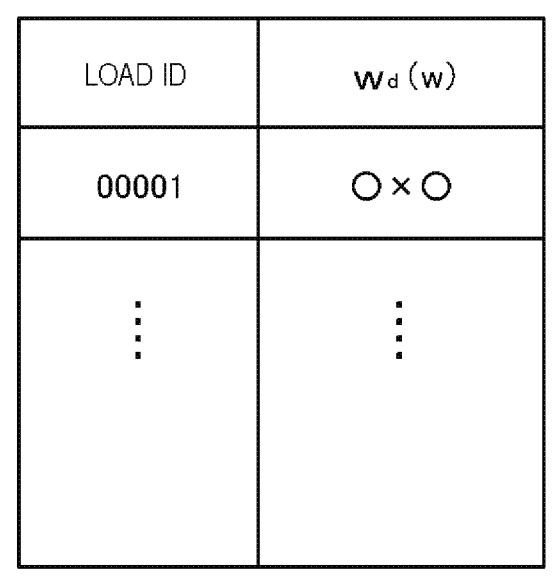

For example, as illustrated in FIG. 7, the load monitoring unit 10 may store identification information of the predetermined load 3. Here, wd corresponding to each load 3 may be associated with the identification information of the predetermined load 3.

Next, a means performed by the load monitoring unit 10 for specifying the ON timing of the predetermined load 3 before the ON timing will be described.

As one example, when an input to turn on the power is received, the predetermined load 3 may start a preparation mode in which power consumption is less than that of a normal operation and transmit its own identification information and notification of turning on the power to the power management apparatus 1 or the monitoring apparatus 6. Then, after a predetermined period of time T (seconds) elapses from the reception of the input, the predetermined load 3 may turn on the power to start the normal operation. In a case in which the notification is transmitted from the predetermined load 3 to the monitoring apparatus 6, the monitoring apparatus 6 transfers the notification to the power management apparatus 1.

When the notification is received from the predetermined load 3 or the monitoring apparatus 6, the load surveillance unit 10 specifies a point of time after the elapse of T−α (seconds) from the reception of the notification as an ON timing at which the predetermined load 3 is turned on. α is any value and is determined in advance in consideration of a period of time during which the notification transmitted from the predetermined load 3 arrives at the load monitoring unit 10 and is processed in the load monitoring unit 10. α is determined in advance for each predetermined load 3 and may be registered in the load monitoring unit 10.

Note that when an input to turn off the power is received, the predetermined load 3 may transmit its own identification information and notification of turning off the power to the power management apparatus 1 or the monitoring apparatus 6. Then, the predetermined load 3 may subsequently turn off the power. In a case in which the notification is transmitted from the predetermined load 3 to the monitoring apparatus 6, the monitoring apparatus 6 transfers the notification to the power management apparatus 1. In this case, based on the notification, the power management apparatus 1 may specify an approximate OFF timing at which the predetermined load 3 is turned off.

As another example, based on a past use record (an operation record in which the power ON and OFF timings (times) are specified) of the predetermined load 3, the server 4 (for example, a cloud server) or the monitoring apparatus 6 may specify an operation pattern of the predetermined load 3 and generate the operation schedule of the predetermined load 3, the operation schedule determining at least an ON timing (time) at which the power is turned on and further possibly, an OFF timing (time). Then, based on the operation schedule, the monitoring apparatus 6 may control operation (ON/OFF of power) of the predetermined load 3.

In this case, the load monitoring unit 10 may acquire the operation schedule of the predetermined load 3 and determine an ON timing (time) at which the predetermined load 3 is turned on and/or an OFF timing (time) based on the operation schedule.

Some power consumers use the predetermined load 3 always at a fixed time. For example, in a case in which power consumers are general households, there may be power consumers that turn on the load 3 such as an air conditioner or a television at a fixed time such as a time immediately after waking up, or returning home and turn off the load 3 at a fixed time such as bedtime or a time at which a user leaves home for work every day. In a facility such as a factory, there may be power consumers that turn on the load 3 such as a machine a predetermined period of time before a starting time and turn off the load 3 at a finishing time every day.

Based on a past use record of the predetermined load 3, the server 4 or the monitoring apparatus 6 may specify the above-described use pattern (a period of time during which each load 3 is turned on and a period of time during which h each load 3 is turned off) and generate an operation schedule for operating the load 3 according to the use pattern. For example, plural past results may be analyzed to specify a period of time during which each load 3 is operated with a predetermined probability (for example, 7 days/10 days) or more. An operation schedule for operating the load 3 during the specified period of time may be generated.

Note that the use pattern may be changed according to an attribute such as the month, day of the week, weather, season, temperature, or humidity. Accordingly, the server 4 or the monitoring apparatus 6 may specify the use pattern for each combination of predetermined attributes. For example, the plural past records may be grouped according to attributes and analyzed for each group, and a period of time during which each load 3 is operated with the predetermined probability (for example, 7 days/10 days) or more may be specified. Corresponding to the attributes of the group, an operation schedule in which the load 3 is operated during the specified period of time may be generated. In this case, the monitoring apparatus 6 extracts the operation schedule which matches the attributes of the day and controls an operation of the load 3 based on the operation schedule. The load monitoring unit 10 may specify an ON timing (time) and/or an OFF timing (time) of the predetermined load 3 based on the extracted operation schedule.

As still another example, a user may generate an operation schedule of each load 3 in advance and input the operation schedule to at least one of each load 3, the monitoring apparatus 6, and the power management apparatus 1. Then, each load 3 may operate based on the operation schedule. Alternatively, based on the operation schedule, the monitoring apparatus 6 may control an operation of each load 3. In this case, the power management apparatus 1 may acquire the operation schedule of the predetermined load 3 and specify an ON timing (time) at which the predetermined load 3 is turned on and/or an OFF timing (time) based on the operation schedule.

In addition, when the load 3 is an air conditioner, a setting temperature of a room, in which the air conditioner is installed, at a predetermined period of time is determined in advance (for example, 20° C. at 7:00) and an operation schedule (at least, an ON timing (time) at which power is turned on) of the air conditioner may be determined based on the setting temperature and a temperature of the room in which the air conditioner is installed. Then, the load 3 may be controlled to be turned on/off based on the operation schedule. Technologies related thereto are disclosed in, for example, Japanese Translation of PCT International Application Publication No. 2014-503878, Japanese Translation of PCT International Application Publication No. 2014-501970, and Japanese Translation of PCT International Application Publication No. 2014-507018. In this case, after a system determines an ON timing or an OFF timing of the air conditioner, the load monitoring unit 10 can acquire an operation schedule indicating the On timing or the OFF timing from the system and specify an ON timing (time) at which the predetermined load 3 is turned on and/or an OFF timing (time) based on the operation schedule.

Note that even in a case in which a timing at which power consumption of the predetermined load 3 exceeds a predetermined value is another timing described above, the timing can be specified before the timing in accordance with the foregoing method.

Referring back to FIG. 6, the power storage system control unit 20 controls the power storage system 2 supplying power into the unit power network 100 to start power supply the predetermined period of time td before the ON timing specified by the load monitoring unit 10.

The predetermined period of time td may be a fixed value which is determined in advance. In this case, whichever predetermined load 3 is turned on, power supply from the power storage system 2 is started the same predetermined period of time td before the ON timing.

The predetermined period of time td may be determined based on, for example, characteristics of the power storage system 2. For example, a period of time from when power supply is started to when the power reaches a maximum output of the power storage system 2 or the period of time+β (any margin time) may be set as the predetermined period of time td. The predetermined period of time td may be registered in advance in the power storage system control unit 20. When the predetermined period of time td is determined in this way, an output of the power storage system 2 can reach the maximum output between the start of the supply of the power and the ON timing (during the period of time td). The predetermined period of time td is, for example, any value equal to or less than 500 milliseconds (the same applies to the following exemplary embodiments).

Note that the predetermined period of time td may be changed according to the characteristics of the predetermined load 3 of which the power is turned on. The change of the predetermined period of time td will be described in the following exemplary embodiment.

While the predetermined load 3 is operated, the power storage system control unit 20 may control the power storage system 2 to continue power supply. For example, the load monitoring unit 10 may specifies an OFF timing, as described above. The power storage system control unit 20 may stop power supply from the power storage system 2 according to the specification of the OFF timing by the load monitoring unit 10.

Figure 8:
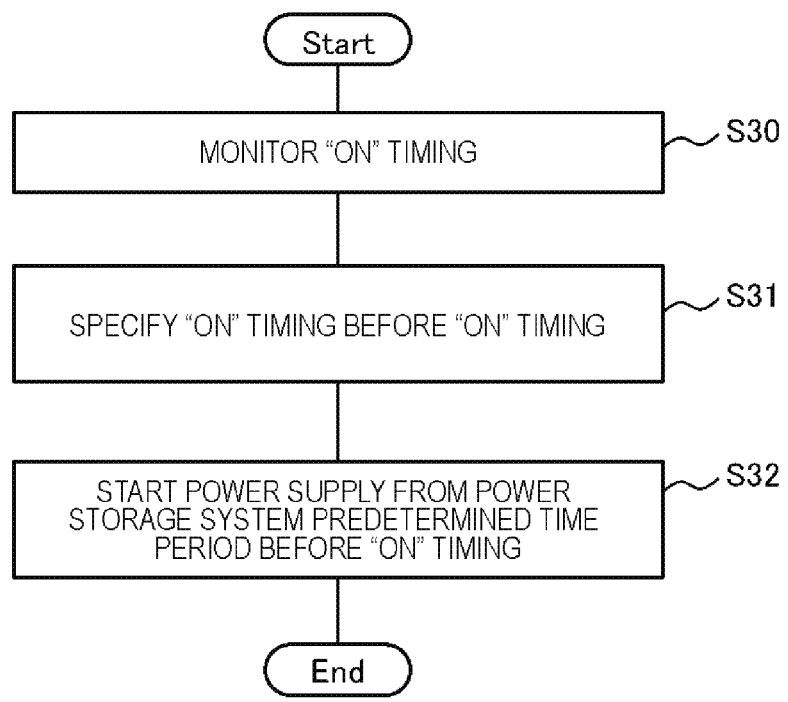
FIG. 8 is a flowchart illustrating an example of the flow of a process of the power management apparatus according to the exemplary embodiment.

Next, an example of the flow of a process of the power management apparatus 1 according to the exemplary embodiment will be described with reference to the flowchart of FIG. 8.

The load monitoring unit 10 monitors the ON timing at which the predetermined load 3 is turned on (S30). Then, the load monitoring unit 10 specifies the ON timing before the ON timing (S31).

When the load monitoring unit 10 specifies the ON timing, the power storage system control unit 20 controls the power storage system 2 to start power supply from the power storage system 2 the predetermined period of time td before the ON timing (S32).

In the power management apparatus 1 according to the above-described exemplary embodiment, as illustrated in FIG. 4, power supply from the power storage system 2 can be started the predetermined period of time td before a timing (for example, a timing at which power is turned on) at which the power consumption of the predetermined load 3 exceeds a predetermined value. That is, power consumption from the power storage system 2 can be increased before the timing and power consumption from the commercial power supply can be kept low.

As a result, even in case in which the power consumption rising velocity (V1) of the predetermined load 3 is greater than the output power rising velocity (V2) of the power storage system 2 and power supply from the power storage system 2 is not readily available, it is possible to reduce inconvenience in which a sum of power consumption of the plural loads 3 from a commercial power supply exceeds the commercial power supply threshold X.

Second Exemplary Embodiment

The exemplary embodiment provides a function of changing the predetermined period of time td for advancing the start of power supply from the power storage system 2, according to changed power consumption of the predetermined load 3 of which power consumption exceeds a predetermined value (for example, power consumption of the predetermined load 3 after power is turned on). The other remaining configuration is the same as that of the first exemplary embodiment.

Hereinafter, a case in which a timing at which power consumption of the predetermined load 3 exceeds a predetermined value is a timing at which the predetermined load 3 is turned on (a timing at which a power supply is applied) will be described as an example. Note that even in a case in which the timing at which the power consumption of the predetermined load 3 exceeds the predetermined value is another timing other than the timing described in the first exemplary embodiment, the same advantageous effects can be realized in accordance with the same method as the method to be described below.

Figure 9:
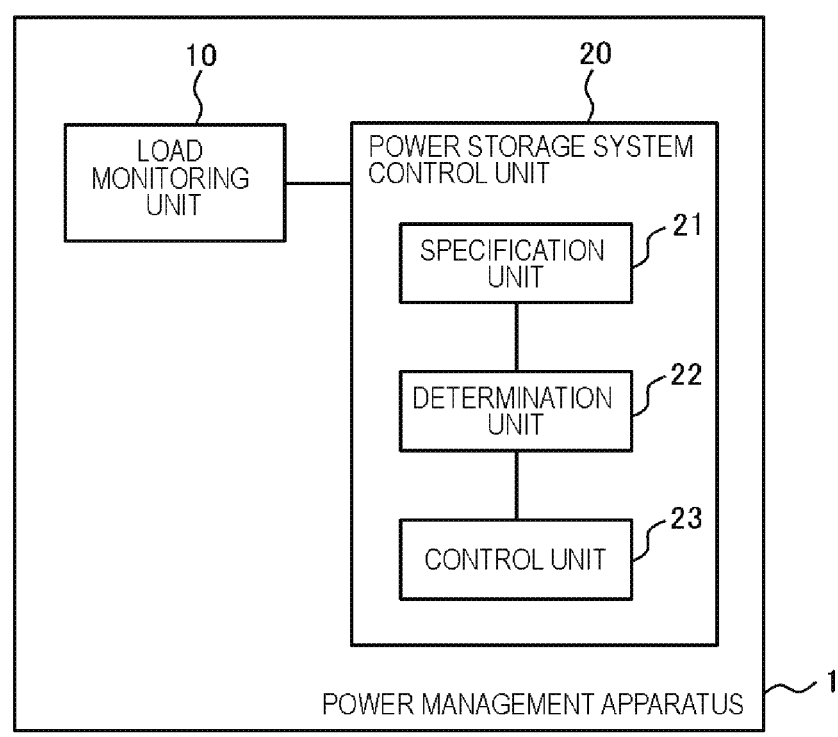
FIG. 9 is an exemplary functional block diagram illustrating the power management apparatus according to the exemplary embodiment.

FIG. 9 is an exemplary functional block diagram illustrating the power management apparatus 1 according to the exemplary embodiment. As illustrated, the power management apparatus 1 includes a load monitoring unit 10 and a power storage system control unit 20. The power storage system control unit 20 includes a specification unit 21, a determination unit 22, and a control unit 23.

The load monitoring unit 10 specifies the ON timing and specifies the predetermined load 3 which is turned on.

The load monitoring unit 10 may specify the ON timing in accordance with the method described in the first exemplary embodiment. For example, based on the identification information of the load 3 included in notification acquired from the predetermined load 3, the load monitoring unit 10 may specify the predetermined load 3 which is turned on. As another example, the load monitoring unit 10 may specify the predetermined load 3 which is turned on, by specifying the ON timing based on the operation schedule of each predetermined load 3.

The specification unit 21 specifies power consumption of the predetermined load 3 which is turned on. For example, the specification unit 21 acquires information (for example, identification information) for specifying the predetermined load 3 which is turned on, from the load monitoring unit 10. Then, wd associated with the predetermined load 3 is specified as the power consumption described above by referring to the information illustrated in FIG. 7 described in the first exemplary embodiment. Note that the information may be information in which power consumption of each of plural possible operation modes of each load 3 is associated with each load 3.

The determination unit 22 determines the predetermined period of time td based on the power consumption (wd) specified by the specification unit 21.

For example, the determination unit 22 may determine a period of time from when the power storage system 2 starts power supply to when the power reaches the power consumption (wd) specified by the specification unit 21 or this period of time+γ (any allowance time) as the predetermined period of time td. In a case in which the predetermined period of time td is determined in this way, the output of the power storage system 2 can reach the power consumption (wd) specified by the specification unit 21 between the start of the power supply and the ON timing (during the period of time td). Note that, in this case, the larger power consumption (wd) the specification unit 21 specifies, the longer predetermined period of time the determination unit 22 determines.

For example, the determination unit 22 may retain association information associating the power consumption (wd) with the predetermined period of time td. An example of the association information is illustrated in FIG. 10. The determination unit 22 may extract the predetermined period of time td associated with the power consumption (wd) specified by the specification unit 21.

In addition, the determination unit 22 may retain a function of calculating the predetermined period of time td from the power consumption (wd) and determine the predetermined period of time td using the function.

Referring back to FIG. 9, the control unit 23 controls the power storage system 2 to start power supply the predetermined period of time td before the ON timing specified by the load monitoring unit 10, the predetermined period of time td being determined by the determination unit 22.

Figure 11:
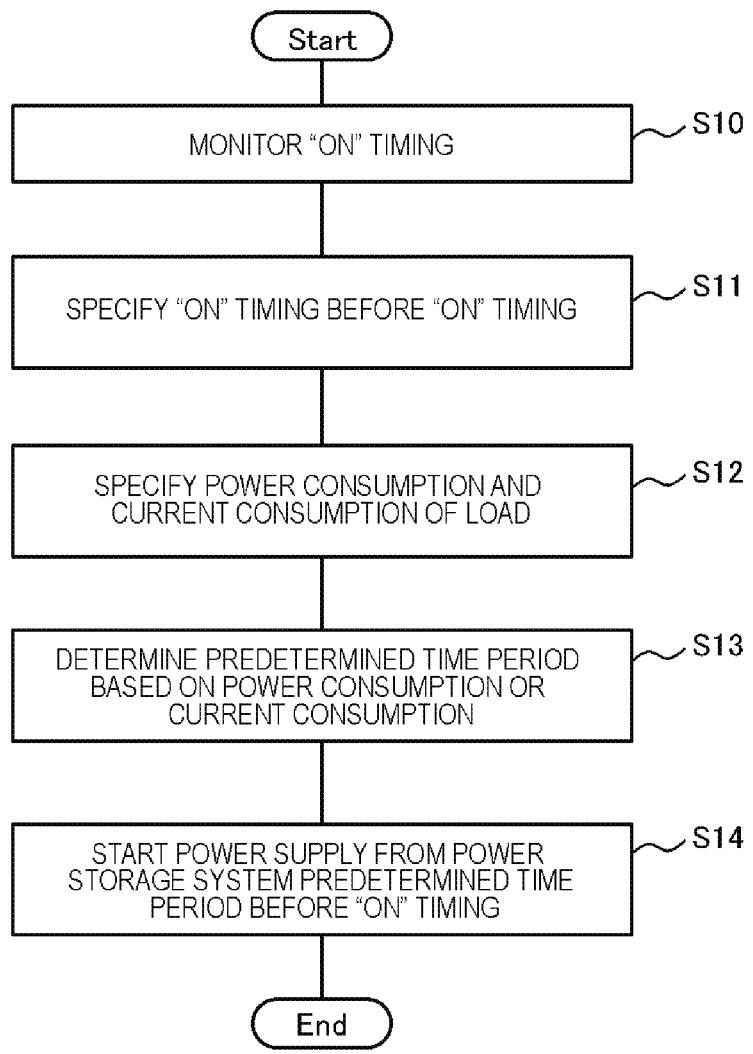
FIG. 11 is a flowchart illustrating an example of the flow of a process of the power management apparatus according to the exemplary embodiment.

Next, an example of the flow of a process of the power management apparatus 1 according to the exemplary embodiment will be described with reference to the flowchart of FIG. 11.

The load monitoring unit 10 monitors the ON timing at which the predetermined load 3 is turned on (S10). Then, the load monitoring unit 10 specifies the predetermined load 3 which is turned on and the ON timing before the ON timing (S11).

When the load monitoring unit 10 specifies the ON timing, the specification unit 21 specifies the power consumption (wd) of the predetermined load 3 which is turned on (S12). Thereafter, the determination unit 22 determines the predetermined period of time td based on the power consumption (wd) specified by the specification unit 21 (S13).

Thereafter, the control unit 23 controls the power storage system 2 to start power supply the predetermined period of time td before the ON timing specified by the load monitoring unit 10, the predetermined period of time td being determined by the determination unit 22 (S14).

In the power management apparatus 1 according to the above-described exemplary embodiment, it is possible to realize the same advantageous effects as those of the first exemplary embodiment.

According to the exemplary embodiment, it is possible to change the predetermined period of time td for advancing the start of power supply from the power storage system 2 according to changed power consumption of the predetermined load 3 of which power consumption exceeds the predetermined value (for example, power consumption of the predetermined load 3 after power is turned on). For example, the period of time from when the power storage system 2 starts the power supply to when power reaches the power consumption (wd) specified by the specification unit 21 or this period of time+γ can be determined as the predetermined period of time td.

In a case in which the predetermined period of time td is determined in this way, the output of the power storage system 2 can reach the power consumption (the predetermined value wd) specified by the specification unit 21 between the start of the power supply and the ON timing (during the period of time td). Therefore, it is possible to reduce the inconvenience in which the sum of the power consumption of the plural loads 3 from the commercial power supply exceeds the commercial power supply threshold X. Since the output from the power storage system 2 is not started unnecessarily early, it is possible to suppress unnecessary discharge from the power storage system 2.

Third Exemplary Embodiment

When a timing at which power consumption of a predetermined load 3 exceeds a predetermined value is specified, the power management apparatus 1 according to the exemplary embodiment determines whether a sum of a power instantaneous value of the unit power network 100 at that point of time and changed power consumption of the predetermined load 3 exceeds a predetermined threshold. When the sum exceeds the predetermined threshold, power supply from the power storage system 2 is started the predetermined period of time td before a timing at which the power consumption exceeds a predetermined value, as described in the first and second exemplary embodiments. On the other hand, when the sum does not exceed the predetermined threshold, power supply from the power storage system 2 is not executed. The other remaining configuration is the same as that of the first exemplary embodiment.

An exemplary functional block diagram of the power management apparatus 1 according to the exemplary embodiment is illustrated in FIG. 6 or 9 as in the first and second exemplary embodiments.

The power storage system control unit 20 determines whether the sum of the instantaneous value of the power consumption in the unit power network 100 and the power consumption of the predetermined load 3 which is turned on exceeds the predetermined threshold. The instantaneous value of the power consumption in the unit power network 100 is an instantaneous value a predetermined period of time (for example, 30 seconds, 15 seconds, 5 seconds, or 3 seconds) before the ON timing.

For example, the power storage system control unit 20 acquires information for specifying the predetermined load 3 which is turned on and the ON timing from the load monitoring unit 10. Then, referring to the information illustrated in FIG. 7, the power storage system control unit 20 specifies the power consumption (wd) of the predetermined load 3 which is turned on.

The power storage system control unit 20 specifies the instantaneous value of the power consumption in the unit power network 100. The instantaneous value may be specified based on information acquired from a measurement sensor installed near the power reception point, the monitoring apparatus 6, or the like.

Thereafter, the power storage system control unit 20 determines whether the sum of the instantaneous value and the power consumption (wd) of the predetermined load 3 which is turned on exceeds a predetermined threshold (for example, the commercial power supply threshold X). When the sum exceeds the predetermined threshold, power supply from the power storage system 2 is started the predetermined period of time td before the ON timing based on the processes described in the first and second exemplary embodiments. On the other hand, when the sum does not exceed the predetermined threshold, the power supply from the power storage system 2 is not executed.

Figure 12:
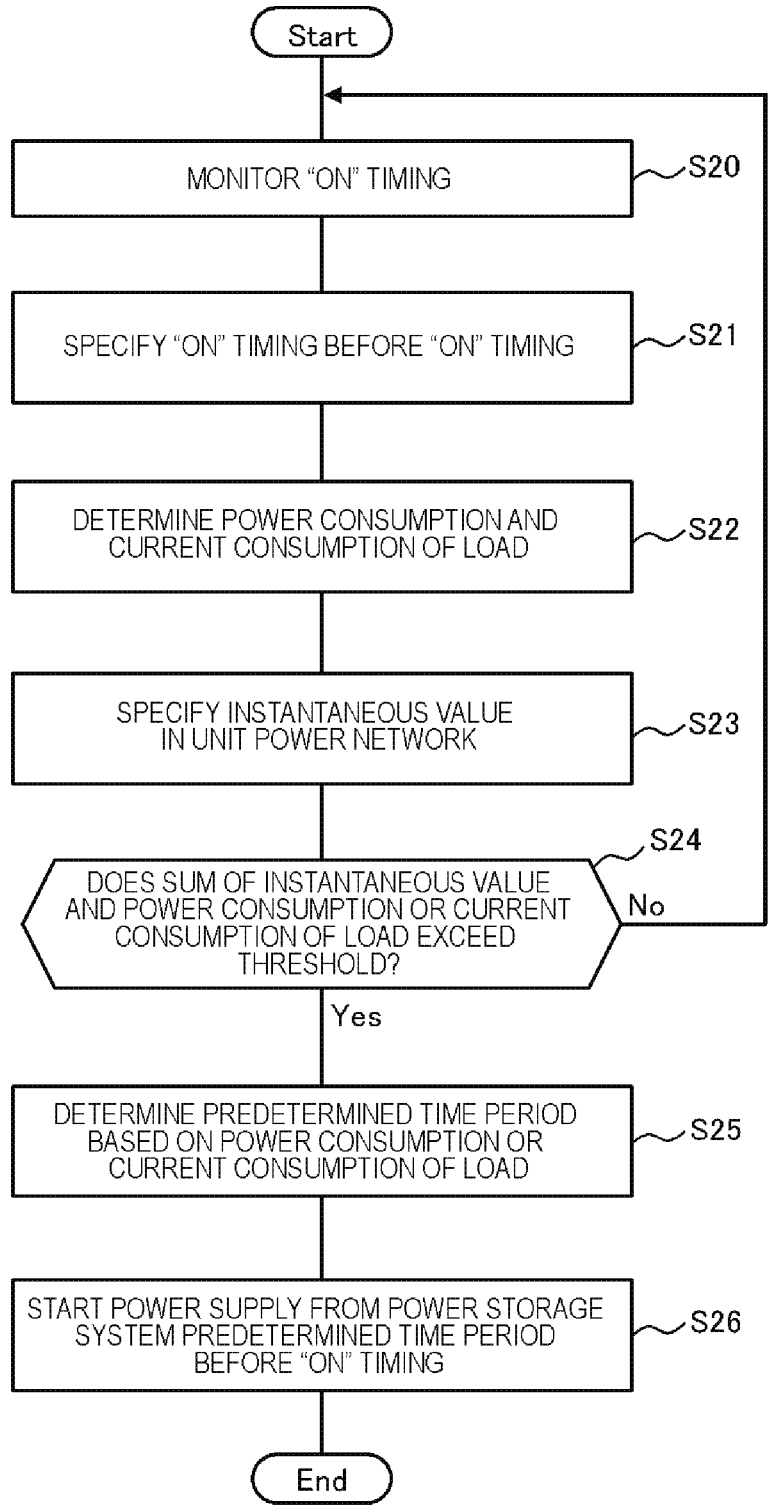
FIG. 12 is a flowchart illustrating an example of the flow of a process of the power management apparatus according to the exemplary embodiment.

Next, an example of the flow of a process of the power management apparatus 1 according to the exemplary embodiment will be described with reference to the flowchart of FIG. 12.

The load monitoring unit 10 monitors the ON timing at which the predetermined load 3 is turned on (S20). Then, the load monitoring unit 10 specifies the predetermined load 3 which is turned on and the ON timing, before the ON timing (S21).

When the load monitoring unit 10 specifies the ON timing, the power storage system control unit 20 specifies the power consumption (wd) of the predetermined load 3 which is turned on (S22). The power storage system control unit 20 specifies the instantaneous value of the power consumption of the unit power network 100 (S23). Note that the processing order of S22 and S23 may be reversed.

Thereafter, the power storage system control unit 20 determines whether the sum of the instantaneous value and the power consumption (wd) of the predetermined load 3 which is turned on exceeds the predetermined threshold (for example, the commercial power supply threshold X) (S24).

When the sum does not exceed the predetermined threshold (No in S24), the process returns to S20 and the load monitoring unit 10 continues to monitor the ON timing. On the other hand, when the sum exceeds the predetermined threshold (Yes in S24), the power storage system control unit 20 determines the predetermined period of time td based on the power consumption (wd) specified in S22 (S25).

Thereafter, the power storage system control unit 20 controls the power storage system 2 to start power supply the predetermined period of time td determined in S25 before the ON timing specified by the load monitoring unit 10 (S26).

Note that, according to the first exemplary embodiment, S25 may be omitted and a process may be performed in S26 using the predetermined period of time td (fixed value) determined commonly to all the predetermined loads 3.

In the power management apparatus 1 according to the above-described exemplary embodiment, it is possible to realize the same advantageous effects as those of the first and second exemplary embodiments.

According to the exemplary embodiment, when the predetermined load 3 is activated, power supply from the power storage system 2 is not constantly executed and the control can appropriately be performed according to the power consumption state in the unit power network 100 at that point of time.

That is, in a case in which the power consumption in the unit power network 100 is large and there is a possibility that the sum of the power consumption of the plural loads 3 from the commercial power supply exceeds the commercial power supply threshold X according to the activation of the predetermined load 3, power supply from the power storage system 2 is started along with the activation of the predetermined load 3.

On the other hand, in a case in which the power consumption in the unit power network 100 is small and there is no (a low) possibility that the sum of the power consumption of the plural loads 3 from the commercial power supply exceeds the commercial power supply threshold X according to the activation of the predetermined load 3, power supply from the power storage system 2 is not executed regardless of the activation of the predetermined load 3.

According to such control, it is possible to reduce power supply from the power storage system 2 at an unnecessary timing (a timing at which there is no (a low) possibility that the sum of the power consumption from the commercial power supply exceeds the commercial power supply threshold X). As a result, it is possible to suppress unnecessary discharge from the power storage system 2.

Here, the case in which the timing at which the power consumption of the predetermined load 3 exceeds the predetermined value is the timing at which the predetermined load 3 is turned on (the timing at which a power supply is applied) has been described as an example. However, even in a case in which the timing at which the power consumption of the predetermined load 3 exceeds the predetermined value may be another timing other than the timing described in the first exemplary embodiment, the same advantageous effects can be realized in accordance with the same method.

Fourth Exemplary Embodiment

In the exemplary embodiment, a process in a case in which there are plural predetermined loads 3 will be described. An exemplary functional block diagram according to the exemplary embodiment is illustrated in FIG. 6 or 9.

The load monitoring unit 10 specifies an ON timing of each of the plural predetermined loads 3 before the ON timing. The other remaining configuration of the load monitoring unit 10 is the same as that of the first to third exemplary embodiment.

In a case in which the power storage system 2 are not executing power supply when the ON timing of a certain predetermined load 3 is specified, the power storage system control unit 20 performs the same process as that of the first to third exemplary embodiment. In this case, the power storage system control unit 20 performs a process (S32 of FIG. 8, S12 to S14 of FIG. 11, or S22 to S26 of FIG. 12) of starting power supply from the power storage system 2 according to the specification of the ON timing of the certain predetermined load 3.

On the other hand, in a case in which the power storage system 2 is already executing power supply when the ON timing of the certain predetermined load 3 is specified, the power storage system control unit 20 continues the power supply from the power storage system 2. In this case, the power storage system control unit 20 does not perform a process (S32 of FIG. 8, S12 to S14 of FIG. 11, or S22 to S26 of FIG. 12) of starting power supply from the power storage system 2 according to the specification of the ON timing of the certain predetermined load 3.

In a case in which the power is being supplied from the power storage system 2 and the other predetermined loads 3 are not operated when an OFF timing of the certain predetermined load 3 is specified, the power storage system control unit 20 may stop the power supply from the power storage system 2. In this case, the power storage system control unit 20 performs a process of stopping the power supply from the power storage system 2 according to the specification of the OFF timing of the certain predetermined load 3.

On the other hand, in a case in which the power is being supplied from the power storage system 2 and the other predetermined loads 3 are operated when the OFF timing of the certain predetermined load 3 is specified, the power storage system control unit 20 may continue the power supply from the power storage system 2. In this case, the power storage system control unit 20 does not perform the process of stopping the power supply from the power storage system 2 according to the specification of the OFF timing of the certain predetermined load 3.

According to the above-described exemplary embodiment, the same advantageous effects as those of the first to third exemplary embodiments can be realized. Even in a case in which there are plural predetermined loads 3, it is possible to appropriately control the power storage system 2 and reduce inconvenience in which the sum of the power consumption from the commercial power supply exceeds the commercial power supply threshold X. It is possible to suppress unnecessary discharge from the power storage system 2.

Here, the case in which a timing at which the power consumption of the predetermined load 3 exceeds the predetermined value is a timing at which the predetermined load 3 is turned on (a timing at which a power supply is applied) is described as an example. Even in a case in which the timing at which the power consumption of the predetermined load 3 exceeds the predetermined value is another timing other than the timing described in the first exemplary embodiment, the same advantageous effects can be realized in accordance with the same method as the method to be described below.

MODIFICATION EXAMPLES

The same advantageous effects can be obtained even when power is replaced with current in the first to fourth exemplary embodiments.

Hereinafter, examples of reference configurations will be appended.

1. A power management apparatus including:
a load monitoring unit that specifies a timing, at which power consumption of a predetermined load present in a unit power network exceeds a predetermined value, before the timing; and
a power storage system control unit that controls a power storage system supplying power into the unit power network to start power supply before the timing by a predetermined period of time.

2. The power management apparatus described in 1,
wherein the power storage system control unit includes
a specification unit that specifies power consumption or a consumption current of the predetermined load,
a determination unit that determines the predetermined period of time based on the power consumption or the consumption current specified by the specification unit, and
a control unit that controls the power storage system to start power supply before the timing by the predetermined period of time.

3. The power management apparatus described in 2,
wherein the determination unit determines a period of time corresponding to the power consumption or the consumption current specified by the specification unit as the predetermined period of time by referring to association information associating a period of time with the power consumption or the consumption current.

4. The power management apparatus described in any one of 1 to 3,
wherein the power storage system control unit controls the power storage system to start power supply before the timing by the predetermined period of time in a case in which a sum of an instantaneous value of power consumption or a consumption current in the unit power network and the power consumption or the consumption current of the predetermined load exceeds a predetermined threshold.

5. The power management apparatus described in any one of 1 to 4,
wherein the predetermined period of time is equal to or less than 500 milliseconds.

6. The power management apparatus described in any one of 1 to 5,
wherein the timing is a timing at which power of the predetermined load is applied.

7. A power management system including:
the power management apparatus according to any one of 1 to 6; and
a power storage system that supplies power into a unit power network.

8. A power management method executed by a computer, the method including:
a load monitoring step of specifying a timing, at which power consumption of a predetermined load present in a unit power network exceeds a predetermined value, before the timing; and
a power storage system control step of controlling the power storage system supplying power into the unit power network to start power supply before the timing by a predetermined period of time.

8-2. The power management method described in 8,
wherein the power storage system control step includes
specifying power consumption or a consumption current of the predetermined load,
determining the predetermined period of time based on the power consumption or the consumption current specified by the step of specifying, and
controlling the power storage system to start power supply before the timing by the predetermined period of time.

8-3. The power management method described in 8-2,
wherein in the step of determining a period of time corresponding to the power consumption or the consumption current specified by the step of specifying is determined as the predetermined period of time by referring to association information associating a period of time with the power consumption or the consumption current.

8-4. The power management method described in any one of 8 to 8-3,
wherein in the power storage system control step, the power storage system is controlled to start power supply before the timing by the predetermined period of time in a case in which a sum of an instantaneous value of power consumption or a consumption current in the unit power network and the power consumption or the consumption current of the predetermined load exceeds a predetermined threshold.

8-5. The power management method described in any one of 8 to 8-4, wherein the predetermined period of time is equal to or less than 500 milliseconds.

8-6. The power management method described in any one of 8 to 8-5, wherein the timing is a timing at which power of the predetermined load is applied.

9. A program causing a computer to function as:

a load monitoring unit that specifies a timing, at which power consumption of a predetermined load present in a unit power network exceeds a predetermined value, before the timing; and a power storage system control unit that controls the power storage system supplying power into the unit power network to start power supply before the timing by a predetermined period of time.

9-2. The program described in 9, wherein the program causes the power storage system control unit to function as a specification unit that specifies power consumption or a consumption current of the predetermined load, a determination unit that determines the predetermined period of time based on the power consumption or the consumption current specified by the specification unit, and a control unit that controls the power storage system to start power supply before the timing by the predetermined period of time.

9-3. The program described in 9-2, wherein the program causes the determination unit to determine a period of time corresponding to the power consumption or the consumption current specified by the specification unit as the predetermined period of time by referring to association information associating a period of time with the power consumption or the consumption current.

9-4. The program described in any one of 9 to 9-3, wherein the program causes the power storage system control unit to control the power storage system to start power supply before the timing by the predetermined period of time in a case in which a sum of an instantaneous value of power consumption or a consumption current in the unit power network and the power consumption or the consumption current of the predetermined load exceeds a predetermined threshold.

9-5. The program described in any one of 9 to 9-4, wherein the predetermined period of time is equal to or less than 500 milliseconds.

9-6. The program described in any one of 9 to 9-5, wherein the timing is a timing at which power of the predetermined load is applied.

10. A monitoring apparatus that detects a timing at which power consumption exceeds a predetermined value and transmits the timing to a power management apparatus controlling a power storage system.

This application claims priority from Japanese Patent Application No. 2014-241720 filed on Nov. 28, 2014, the content of which is incorporated herein by reference in its entirety.

The invention claimed is:

1. A power management apparatus comprising:

a load monitoring unit that specifies a timing, at which power consumption of a predetermined load present in a unit power network exceeds a predetermined value, before the timing; and a power storage system control unit that controls a power storage system supplying power into the unit power network to start supplying power into the unit power network before the timing by a predetermined period of time, preventing a power received from a commercial supply from exceeding a predetermined value, wherein the power storage system control unit comprises:

a specification unit that specifies power consumption or a consumption current of the predetermined load, a determination unit that determines the predetermined period of time based on the power consumption or the consumption current specified by the specification unit, and a control unit that controls the power storage system to start power supply before the timing by the predetermined period of time;

wherein the determination unit determines a period of time corresponding to the power consumption or the consumption current specified by the specification unit as the predetermined period of time by referring to association information associating a period of time with the power consumption or the consumption current.

2. The power management apparatus according to claim 1, wherein the power storage system control unit controls the power storage system to start power supply before the timing by the predetermined period of time in a case in which a sum of an Instantaneous value of power consumption or a consumption current in the unit power network and the power consumption or the consumption current of the predetermined load exceeds a predetermined threshold.

3. The power management apparatus according to claim 1, wherein the predetermined period of time is equal to or less than 500 milliseconds.

4. The power management apparatus according to claim 1, wherein the timing is a timing at which a power supply of the predetermined load is applied.

5. A power management system comprising:

the power management apparatus according to claim 1; and a power storage system that supplies power into a unit power network.

6. A power management method executed by a computer, the method comprising:

a load monitoring step of specifying a timing, at which power consumption of a predetermined load present in a unit power network exceeds a predetermined value, before the timing;

a power storage system control step of controlling a power storage system supplying power into the unit power network to start supplying power into the unit power network before the timing by a predetermined period of time, preventing a power received from a commercial supply from exceeding a predetermined value;

a specification step of specifying power consumption or a consumption current of the predetermined load;

a determination step of determining the predetermined period of time based on the power consumption or the consumption current specified by the specification step; and a control step of controlling the power storage system to start power supply before the timing by the predetermined period of time;

wherein the determination step includes determines a period of time corresponding to the power consumption or the consumption current specified by the specification step as the predetermined period of time by referring to association information associating a period of time with the power consumption or the consumption current.

7. A non-transitory storage medium storing a program causing a computer to function as:

a load monitoring unit that specifies a timing, at which power consumption of a predetermined load present in a unit power network exceeds a predetermined value, before the timing; and a power storage system control unit that controls the power storage system supplying power into the unit power network to start supplying power into the unit power network before the timing by a predetermined period of time, preventing a power received from a commercial supply from exceeding a predetermined value, wherein the power storage system control unit comprises:

a specification unit that specifies power consumption or a consumption current of the predetermined load, a determination unit that determines the predetermined period of time based on the power consumption or the consumption current specified by the specification unit, and a control unit that controls the power storage system to start power supply before the timing by the predetermined period of time;

wherein the determination unit determines a period of time corresponding to the power consumption or the consumption current specified by the specification unit as the predetermined period of time by referring to association information associating a period of time with the power consumption or the consumption current.

* * * * *